United States Patent [19]

Curry

[11] 3,760,000

[45] Sept. 18, 1973

[54] PREPARATION OF PHOSPHINE OXIDES BY CATALYTIC OXIDATION OF TERTIARY PHOSPHINES

[75] Inventor: John D. Curry, Oxford, Ohio

[73] Assignee: The Proctor & Gamble Company, Cincinnati, Ohio

[22] Filed: Mar. 15, 1971

[21] Appl. No.: 124,452

[52] U.S. Cl. ............................................. 260/605.6 P
[51] Int. Cl. ................................................. C07f 9/50
[58] Field of Search .................................. 260/606.5

[56] References Cited
UNITED STATES PATENTS 3,573,292   3/1971   Wilke et al. ................... 260/606.5 P

OTHER PUBLICATIONS

Takahashi et al., Chemical Society of Japan, (1966), Vol. 87, pages 610–613, QD1C57.

Chatt et al., Journal Chemical Society, (1962), part 2, pages 2537–2538, QDIC6.

*Primary Examiner*—Werten F. W. Bellamy
*Attorney*—Jack D. Schaeffer and Richard C. Witte

[57] ABSTRACT

Process for preparing trialkyl and triaryl phosphine oxides employing zero-valent palladium complexes of ditertiary phosphines as catalysts. The resulting phosphine oxides are useful as surfactants and in skin preparations.

7 Claims, No Drawings

PREPARATION OF PHOSPHINE OXIDES BY CATALYTIC OXIDATION OF TERTIARY PHOSPHINES

BACKGROUND OF THE INVENTION

The present invention relates to a process for preparing tertiary phosphine oxides by the catalytic oxidation of trialkyl or triaryl phosphines using zero-valent palladium complexes of di-tertiary phosphines as catalysts.

Tertiary phosphine oxides (a term which encompasses both trialkyl and triaryl phosphine oxides) represent a class of components of commercial importance in the detergent and cosmetic fields. These materials can be prepared by the oxidation of tertiary phosphines, which, in turn, can be prepared by the reaction of various phosphorus halides with Grignard reagents in well-known fashion. However, direct oxidation of many such tertiary phosphines, especially the alkyl phosphines, with oxygen yields complex mixtures of the desired phosphine oxide, phosphonates, phosphinates and phosphates. It will be recognized, then, that such reactions are not generally suited for the preparation of this desirable class of materials. For this reason, there have been suggested in the art various means for oxidizing tertiary phosphines to the corresponding phosphine oxides without th formation of these undesirable by-products. For example, U.S. Pat. No. 3,532,774 to Maier, issued Sept. 29, 1966, describes a process for preparing phosphine oxides and phosphinates by heating and isomerizing certain aminophosphines. Such procedures are not attractive for use in large scale industrial processes in that they require the preparation of the intermediate materials followed by a second reaction to induce decomposition and isomerization before yielding the desired product.

A catalytic process capable of oxidizing tertiary phosphines to the corresponding phosphine oxides using oxygen, but without the formation of undesirable oxidation by-products, is the most direct route to the preparation of the phosphine oxides. S. Takahashi, K. Sonogashira and N. Hagihara, Nippon Kagaku Zasshi, 87 (6) 610 (1966) disclose the use of tetrakis-triphenylphosphine palladium compounds as catalysts for the oxidation of trialkyl and triaryl phosphines to the corresponding oxides. However, these prior art catalysts are not particularly useful on an industrial scale since their "turnover number" is relatively small. (By "turnover number" is meant the equivalents of trialkyl or triaryl phosphine which can be converted to phosphine oxide per equivalent of catalyst before the catalyst becomes inactivated.) Since palladium catalysts are relatively expensive it would be desirable to provide catalysts with high turnover numbers capable of cleanly oxidizing tertiary phosphines to the corresponding phosphine oxides.

Accordingly, it is an object of this invention to provide a catalytic process for preparing trialkyl and triaryl phosphine oxides from the corresponding tertiary phosphines. It is another object to provide a process for oxidizing tertiary phosphines to tertiary phosphine oxides employing catalysts which have high turnover numbers. These and other objects are obtained by the present invention as will become apparent from the following disclosure.

SUMMARY OF THE INVENTION

The present invention encompasses a process for oxidizing tertiary phosphines to tertiary phosphine oxides comprising the steps of: (1) dissolving a tertiary phosphine of the type hereinafter disclosed and a zero-valent palladium compound having the formula $$Pd(Ar_2PCH_2CH_2PAr_2)_2$$

wherein each Ar represents phenyl or substituted phenyl groups of the type hereinafter disclosed, at a molar ratio of tertiary phosphine to palladium compound of at least 1:1, in an aromatic solvent; (2) introducing oxygen (or air) into the reaction mixture prepared in step (1) while maintaining the reaction temperature within the range of from 0°C to 60°C; and (3) recovering the tertiary phosphine oxide.

DETAILED DESCRIPTION OF THE INVENTION

The tertiary phosphine to be oxidized herein, the zero-valent palladium cataylst and the aromatic solvent can each contain substituent groups of various types as hereinafter detailed. Since the palladium catalyst is capable of forming coordination complexes with the substituent groups present in any of the materials in the reaction mixture it is preferred that such substituent groups in the phosphine, the catalyst and the solvent be inert. (The term "inert" as used herein refers to substituent groups that do not form coordination compounds with the catalyst.) In general, preferred aromatic solvents, tertiary phosphines and zero-valent palladium complexes of formula (I) herein include those containing substituent groups such as hydrogen, alkyl ($C_1$ to $C_{20}$), halogen, and alkoxyl (e.g., methoxyl, ethoxyl, butoxyl, etc.) groups. Substituent groups containing nitrogen and oxygen (with the exception of alkoxyl groups) and their congeners, e.g., nitroso, nitro, amino, thiol, carboxyl, carbonyl, and the like are perferably avoided herein since they complex the palladium catalyst and render it less catalytically active.

The inert tertiary phosphines oxidized herein have for formula $R_3P$, wherein each R is alkyl ($C_1$ to $C_2$), aryl, e.g., phenyl, halophenyl, alkoxyphenyl, naphthyl, tolyl, xylyl and the like. Alkyl tertiary phosphines can be prepared according to the general process described in U.S. Pat. No. 3,499,039, to H. J. Lorenz, et al., issued Mar. 3, 1970, incorporated herein by reference. By this process phosphorus trihalides are reacted with Grignard reagents to afford trialkyl phosphines of the type useful herein. In similar fashion, aryl Grignard reagents, more especially phenyl, naphthyl and substituted phenyl Grignard reagents having substituents of the type noted above, can be reacted with phosphorus trihalides (e.g., $PCl_3$, $PBr_3$) to provide tertiary aryl phosphines which can be oxidized to tertiary phosphine oxides by the process disclosed herein. Since the Grignard addition of aryl or alkyl groups (R in the above formula) to phosphorus trihalides is a step-wise process, it is possible to prepare tertiary phosphines wherein the aryl or alkyl groups R are the same or different. For example, three moles of an aryl Grignard reagent will react with one mole or a phosphorus trihalide to yield a triaryl phosphine. One mole of an alkyl Grignard reagent will react with one mole of a phosphorus trihalide to yield an alkylphosphorus dihalide which, in turn, can be reacted with other Grignard reagents to yield mixed trialkyl and tertiary alkyl-aryl phosphines which can be suitably employed in the catalytic oxidation described herein. Exemplary tertiary alkyl, aryl and alkylaryl phosphines which can be oxidized by the present process to the corresponding phosphine oxides include: triethylphosphine, tributylphosphine, triphenylphosphine, triseicosylphosphine, tri-m-tolylphosphine, tri-p-chlorophenylphosphine, dimethyldodecylphosphine, dimethyleicosylphosphine, diphenyldodecylphosphine and the like.

Step (1) of the present process comprises co-dissolving the tertiary phosphine of the formula $R_3P$, wherein R is as noted above, and a zero-valent palladium catalyst of the type hereinafter detailed in an aromatic solvent. Suitable aromatic solvents include benzene and many of the common benzene derivatives such as halogenated, alkylated and alkoxylated benzenes which are liquids at the reaction temperatures employed herein, e.g., chlorobenzene, m-dichlorobenzene, bromobenzene, toluene, p-chlorotoluene fluorobenzene, m-iodotoluene, trichlorobenzene, the various xylenes, anisole, ethoxybenzene, p-fluoroanisole and the like; chlorobenzene is preferred. The tertiary phosphines and catalysts are quite soluble in the aromatic solvents and are readily dissolved therein by stirring. For most purposes the aromatic solvent is used in amounts from about five to ten times the weight of the tertiary phosphine being oxidized, and greater.

The zero-valent palladium catalyst used in the present process comprises a di-(1,2-bis-diarylphosphinoethane)palladium compound having the general structure $Pd(Ar_2PCH_2CH_2PAr_2)_2$, wherein Ar represents phenyl an substituted phenyl groups, preferably those with non-palladium complexing substituents of the type noted above on one or more of the phenyl rings. Such substituents include halogen, alkoxyl, i.e., methoxyl, ethoxyl, etc., alkyl, i.e., methyl, propyl, etc. Exemplary zero-valent palladium compounds of the general type used herein are prepared by the reaction of the corresponding phenylphosphinoethane ligand with an inorganic bivalent palladium salt, e.g., palladium chloride, followed by reduction of the palladium to the zero-valent state with agents such as sodium borohydride. A general description of the preparation of di-(1,2-bis-diphenylphosphinoethane)palladium, which is the zero-valent palladium compound preferred for catalytic use herein, is found in J. Chatt, et al., J. Chem. Soc., (1962) 2537.

The catalytic amount of the zero-valent palladium compound of formula (I) used herein is based on the molar ratio of tertiary phosphine being oxidized to catalyst. This molar ratio of tertiary phosphine:catalyst is at least 1 to 1. For most purposes, the ratio of tertiary phosphine to palladium cayalyst will be about 1000:1, more preferably 500:1. It is seen, therefore, that the amount of tertiary phosphine oxidized per mole of palladium cayalyst can be varied over a wide ratio range and can be increased even further by avoiding deactivation of the catalyst by materials capable of coodinating zero-valent palladium, solvent impurities, excessively high temperatures and the like.

Step (2) of the present process involves introducing oxygen, or an oxygen source such as air, into the reaction mixture prepared in Step (1). Since the oxidation of the tertiary phosphines by this process proceeds with the least formation of undesirable oxidation by-products at temperatures from the range of about 0°C to about 60°C, and since the oxidation herein is exothermic, it is sometimes necessary to employ cooling, for example with an ice bath, to maintain the optimum reaction temperature during this step of the process. However, this is not difficult and standard stirring and ice bath techniques can be used to maintain a temperature within the optimum range. Likewise, it will be recognized that the rise in reaction temperature will depend somewhat on the concentrations of reactants in the aromatic solvent and upon the rate of introduction of oxygen into the reaction mixtrue, and temperature maintenance can be achieved by variations in these factors.

In Step (3) the phosphine oxide is recovered by standard methods, e.g., by distillation or crystallization.

The following examples illustrated the catalytic oxidation process of this invention but are not intended to be limiting thereof. The preferred zero-valent palladium catalyst used in the reactions was prepared according to the procedure of J. Chatt, et al., J. Chem. Soc., (1962) 2537. For example, 5.0 g. of 1,2-bis-diphenylphosphinoethane (commerically available), 1.11 grams of palladium (II) chloride and 125 ml. of ethyl alcohol were refluxed for 10 minutes, filtered, cooled, reacted with NaBr solution and the solids recovered. 0.416 g. of the solid material prepared in the foregoing manner was dissolved in 1000 ml. of a 1:1 acetone:water mixture, cooled to 10°C and a solution containing 2.0 g. of sodium borohydride in 30 ml. of water added thereto. The yellow matter which precipitated was recovered by filtration under nitrogen and dried under vacuum over phosphorus pentoxide and proved to be di-(1,2-bis-diphenylphosphinoethane)palladium, which is the preferred catalyst used herein.

EXAMPLE I

Oxidation of Tributylphosphine

Step 1. 7.55 g. of tributylphosphine and 0.091 g. of di-(1,2-bis-diphenylphosphinoethane)palladium where dissolved in 48 ml. of chlorobenzene.

Step 2. Oxygen was bubbled through the mixture prepared in Step (1) through a coarse glass frit with vigorous stirring. The reaction temperature was maintained between 25°C and 45°C with an ice bath.

Step 3. After one hour, the oxygen flow was stopped and the product was separated and analyzed by gas chromatography and proved to be almost exclusively tributylphosphine oxide. A turnover number of about 370 was achieved in this oxidation.

The process was repeated using 13.04 g. of tributylphosphine and 0.063 g. of di-(1,2-bis-diphenylphosphinoethane)-palladium in 100 ml. of chorobenzene;after 6 hours, tributylphosphine oxide was obtained at a turnover number of approximately 560.

In the above process the tributylphosphine is replaced by an equivalent amount of trimethylphosphine, dimethyldodecylphosphine, triphenylphosphine, docosylethylbutylphosphine, methyl-di-(p-chlorophenyl)phosphine, tris-eicosylphosphine and m-ethyl-p-methoxyphenyl-α-naphthylphosphine, respectively, and equivalent results are obtained in that these tertiary phosphines are oxidized to the corresponding phosphine oxides.

The di-(1,2-bis-diphenylphosphinoethane)palladium is replaced by an equivalent amount of di-(1,2-bis-di-p-chlorophenylphosphinoethane)palladium prepared from palladium (II) chloride, 1,2-bis-di-p-chlorophenylphosphinoethane and sodium borohydride in the manner described above and equivalent results are secured in that the tributylphosphine is oxidized to tributylphosphine oxide.

In the above process the di-(1,2-bis-diphenylphosphino-ethane)palladium is replaced by an equivalent amount of di-(1,2-bis-di-o-methoxyphenylphosphinoethane)palladium, di-(1,2-bis-di-m-fluorophenylphosphinoethane)palladium and di-(1,2-bis-di-p-tolylphosphinoethane)palladium prepared from the corresponding aryl phosphinoethane compounds, palladium (II) chloride and sodium borohydride in the manner described above, and equivalent results are secured in that the tributylphosphine is oxidized to tributylphosphine oxide.

In the above process, the oxygen is replaced by approximately a six-fold increased volume of air which has been purified (removal of $CO_2$ and $SO_2$) by passage through NaOH solution and a drying train ($MgSO_4$). The reaction temperature is maintained at 0°C and 50°C, respectively, and the tributylphosphine is oxidized to tributylphosphine oxide.

In the above process, the chlorobenzene solvent is replaced by an equivalent amount of bromobenzene, anisole, p-dichlorobenzene, fluorobenzene, m-iodotoluene, 2,4,6-trichlorobenzene, ethoxybenzene, p-fluoro-anisole, toluene, p-xylene, m-xylene, benzene, and p-chlorotoluene, respectively, and the tributylphosphine is oxidized to tributylphosphine oxide.

In the above process the molar ratio of tributyl phosphine to palladium catalyst is maintained at 1:1, 1000:1 and 2000:1 and the tributylphosphine oxide is secured.

What is claimed is:

1. A process for oxidizing tertiary phosphines to tertiary phosphine oxides comprising the steps of: (1) dissolving a tertiary phosphine and a zero-valent palladium compound having the formula $$Pd(Ar_2PCH_2CH_2PAr_2)_2$$

wherein each Ar represents phenyl or substituted phenyl groups at a molar ratio of tertiary phosphine to palladium compound of at least 1:1 in an aromatic solvent; (2) introducing oxygen into the reaction mixture prepared in step (1) while maintaining the reaction temperature within the range of from 0°C to 60°C; and (3) recovering the tertiary phosphine oxide.

2. A process according to claim 1 wherein the zero-valent palladium compound is di-(1,2-bis-diphenylphosphinoethane)palladium.

3. A process according to claim 1 wherein the tertiary phosphine is selected from the group consisting of tributylphosphine, trimethylphosphine, dimethyl-dodecylphosphine, triphenylphosphine, docosylethylbutylphosphine, methyl-di-(p-chlorophenyl)phosphine, tris-eicosylphosphine and m-ethyl-p-methoxyphenyl-α-naphthylphosphine.

4. A process according to claim 1 wherein the aromatic solvent is selected from the group consisting of chlorobenzene, bromobenzene, anisole, p-dichlorobenzene, toluene, m-xylene, p-xylene, p-chlorotoluene and benzene.

5. A process according to claim 1 which is carried out at a temperature from about 25°C to about 45°C.

6. A process according to claim 1 wherein the molar ratio of tertiary phosphine to zero-valent palladium catalyst is in the range from about 500:1 to about 1000:1.

7. A process according to claim 1 wherein the tertiary phosphine is tributylphosphine, the solvent is chlorobenzene, the zero-valent palladium compound is di-1,2-bis-diphenylphosphinoethane at a molar ratio of tributylphosphine to palladium compound of approximately 560, and wherein the reaction is carried out at a temperature between about 25°C and 45°C.

* * * * *